United States Patent
Kotha et al.

(10) Patent No.: US 9,367,411 B2
(45) Date of Patent: *Jun. 14, 2016

(54) SYSTEM AND METHOD FOR AN INTEGRATED OPEN NETWORK SWITCH

(71) Applicant: Dell Products, LP, Round Rock, TX (US)

(72) Inventors: Saikrishna Kotha, San Jose, CA (US); Dean W. Peters, Liberty Hill, TX (US); Gaurav Chawla, Austin, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/598,666

(22) Filed: Jan. 16, 2015

(65) Prior Publication Data

US 2015/0135007 A1 May 14, 2015

Related U.S. Application Data

(63) Continuation of application No. 13/216,642, filed on Aug. 24, 2011, now Pat. No. 8,954,782.

(51) Int. Cl.
*G06F 11/20* (2006.01)

(52) U.S. Cl.
CPC .......... *G06F 11/2033* (2013.01); *G06F 11/203* (2013.01); *G06F 2201/805* (2013.01)

(58) Field of Classification Search
CPC .................. H04L 2012/5679; H04L 49/1553; H04L 49/255; H04L 49/254; H04L 49/354; H04L 49/351
See application file for complete search history.

(56) References Cited

U.S. PATENT DOCUMENTS

| | | | | |
|---|---|---|---|---|
| 5,896,380 | A * | 4/1999 | Brown et al. | 370/388 |
| 6,567,403 | B1 * | 5/2003 | Congdon et al. | 370/389 |
| 7,430,164 | B2 | 9/2008 | Bare | |
| 7,480,303 | B1 | 1/2009 | Ngai | |
| 7,561,571 | B1 * | 7/2009 | Lovett et al. | 370/392 |
| 7,639,605 | B2 * | 12/2009 | Narayanan et al. | 370/219 |
| 7,706,364 | B2 | 4/2010 | Smith et al. | |
| 2010/0057908 | A1 | 3/2010 | Smith et al. | |
| 2010/0135307 | A1 * | 6/2010 | Nakagawa | 370/395.53 |
| 2011/0085560 | A1 | 4/2011 | Chawla et al. | |
| 2011/0103259 | A1 | 5/2011 | Aybay et al. | |
| 2011/0107004 | A1 | 5/2011 | Maitra | |
| 2011/0173441 | A1 | 7/2011 | Bagepalli et al. | |
| 2011/0202701 | A1 | 8/2011 | Maitra | |
| 2011/0271102 | A1 * | 11/2011 | Smith | 713/160 |
| 2012/0106526 | A1 * | 5/2012 | Yousefi et al. | 370/338 |
| 2013/0055010 | A1 | 2/2013 | Kotha et al. | |
| 2013/0318310 | A1 * | 11/2013 | Yamauchi et al. | 711/151 |
| 2014/0146824 | A1 * | 5/2014 | Angst et al. | 370/401 |
| 2014/0280826 | A1 * | 9/2014 | Cors et al. | 709/223 |

* cited by examiner

*Primary Examiner* — Bryce Bonzo
*Assistant Examiner* — Jeison C Arcos
(74) *Attorney, Agent, or Firm* — Larson Newman, LLP

(57) ABSTRACT

A device includes a first processing unit and a second processing unit. The first processing unit is configured to execute a performance test on the device. The second processing unit is in communication with the first processing unit, and is configured to migrate an application from the second processing unit to the first processing unit. The second processing unit is further configured to detect a failure of the first processing unit, to migrate the application to a third processing unit in response to the failure of the first processing unit, and to assign a first plurality of ports to the third processing unit in response to the failure of the first processing unit.

20 Claims, 5 Drawing Sheets

SYSTEM AND METHOD FOR AN INTEGRATED OPEN NETWORK SWITCH

CROSS REFERENCE TO RELATED APPLICATIONS

This application is a continuation of U.S. patent application Ser. No. 13/216,642 entitled "System and Method for an Integrated Open Network Switch," filed on Aug. 24, 2011, the disclosure of which is hereby expressly incorporated by reference in its entirety.

FIELD OF THE DISCLOSURE

This disclosure generally relates to information handling systems, and more particularly relates to a system and method for an integrated open network switch.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

Typically network switches include a data plane and a control plane. The data plane can be implemented by application specific integrated circuits (ASICs) and network processing units (NPUs) to provide line speed performance. The control plane can comprise a Layer 2 or Layer 3 protocol stack, security, quality of service (QoS), and other switch management modules. The features of the control plane can be run on a central processing unit (CPU) complex of the switching device. Management of the switch can be performed using command line interface, simple network management protocol (SNMP), web interfaces and the like. A network can be formed by a set of network switches that each has the control plane software to control the switches. Network functionality can depend on convergences of all the network switch elements control plane software. A one-to-many tool, such as a network management system (NMS), can be used to monitor and configure a set of devices. The NMS can be a distributed control plane that can make each switch be upgraded when a patch or upgrade is provided to a single switch in the NMS.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
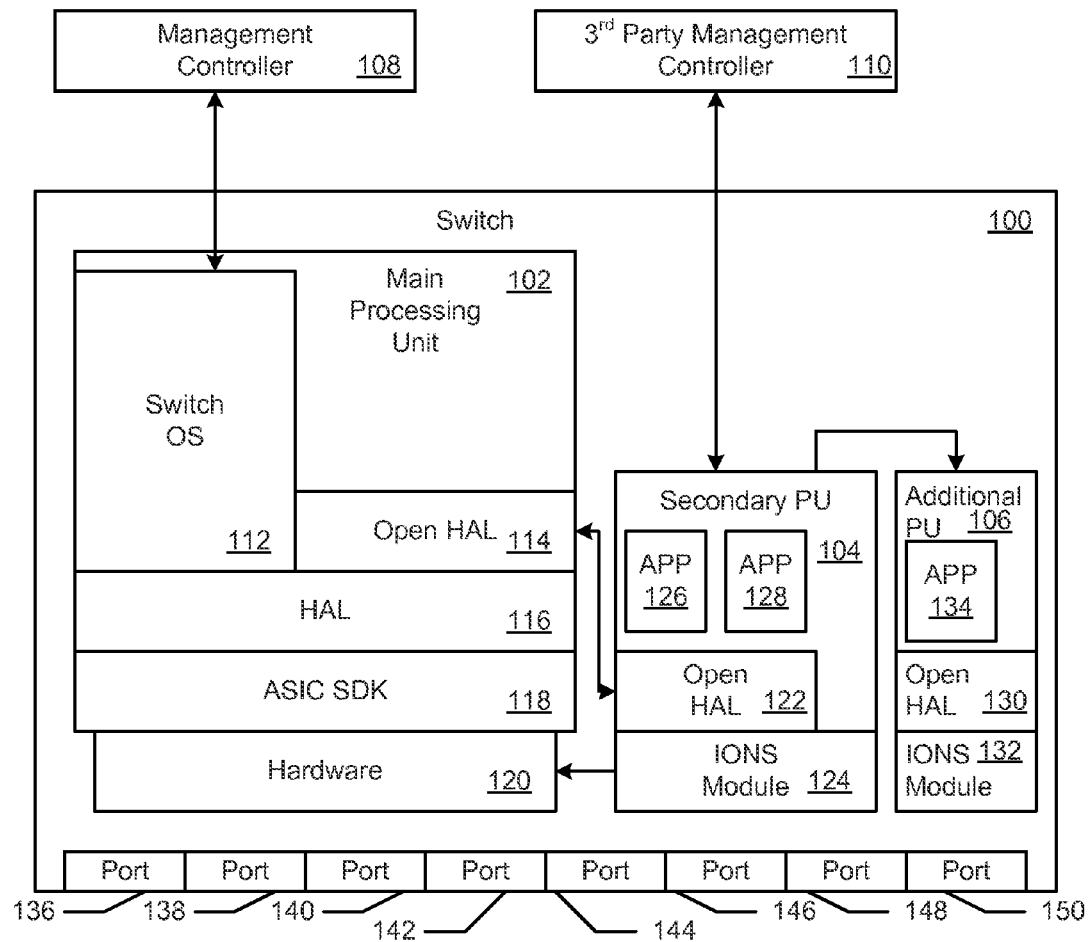
FIG. 1 is a block diagram of an integrated open switch device.

FIG. 1 shows an integrated open switch device 100 for information handling system. For purposes of this disclosure, the information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports fir communicating with external devices as well as various input and output (I/O) devices, such as a keyboard, a mouse, and a video display. The information handling system may also include one or more buses operable to transmit communications between the various hardware components.

The integrated open switch device 100 includes a main processing unit 102, a secondary processing unit 104, and an additional processing unit 106. The main processing unit can be in communication with a management controller 108 for the switch 100. The secondary switch 104 can be in communication with a third party management controller 110. The main processing unit 102 includes a switch operating system (OS) 112, an open hardware abstraction layer (HAL) 114, a HAL 116, an application specific integrated circuit (ASIC) software development kit (SDK) 118, and hardware 120. The hardware 120 can be an ASIC or the like. The secondary processing unit 104 includes an open HAL 122, integrated open network switch (IONS) module 124, and applications 126 and 128. The additional processing unit 106 includes an open HAL 130, an IONS module 132, and an application 134. The switch 100 also includes ports 136-150.

The IONS module 124 of the secondary processing unit 104 can communicate with the hardware 120 of the main processing unit 102. The IONS module 124 can also communicate with the switch OS 112 via the open HAL 122 of the secondary processing unit 104 and the open HAL 114 of the main processing unit 102. The communication between open HAL 114 and open HAL 122 can be via a remote procedure call. In an embodiment, the main processing unit 102 can run a different OS than the secondary processing unit 104 and the additional processing unit 106. For example, the main processing unit 102 may run VxWorks, and the secondary processing unit 104 and the additional processing unit 106 may run Linux.

The open HAL 122 can interact with the open HAL 114 to invoke services of the hardware 120 and the switch OS 112. These services can allow the IONS module 124 and the applications 126 and 128 to perform different functions of the main processing 102 unit on data in the secondary processing unit 104. All of the ports 136-150 can be visible to both the ASIC SDK 118 of the main processing unit 102 and the IONS module 124 of the secondary processing unit 104. The applications 126 and 128 can be executed by the IONS module 124 of the secondary processing unit 104. The applications 126 and 128 can be traditional network services, data plane aware applications, a management application, and the like. The traditional network services can be dynamic host configuration protocol (DHCP), domain name system (DNS), security appliance software, load balancer, firewall, Internet storage name service (iSNS), or the like. The data plane aware applications can be an openflow agent, a layer 2 or layer 3 tunneling application, or the like. The management applications can be server management, advanced information management (ATM) software, and the like.

During operation, one of the applications, such as application 126, can be run on the IONS module 124 to perform different functions. For example, the application 126 can use the open HAL 122 to access the main processing unit 102 and to determine which data flows should be forwarded to the IONS module 124. The application 126 can also utilize the open HAL 122 to send packets generated by the application to different components in the switch 100, to external devices, and the like. The application 126 can further use the open HAL 122 to program the ASIC SDK 118 of the main processing unit to do inline hardware offload functions for a particular data flow.

The management controller 108 can access the main processing unit 102 and can cause the main processing unit to partition the ports 136-150, such that data flows received at certain ports are forwarded from the hardware 120 to ASIC SDK 118 and the switch OS 112 of the main processing unit, and data flows received at the other ports are forwarded directly to the IONS module 124 of the secondary processing unit 104. The management controller 108 can also cause the main processing unit 102 to migrate third party applications that are typically performed by the main processing unit to the secondary processing unit 104. In addition to the applications listed above, the secondary processing unit 104 can also execute performance tests on the main processing unit 102 and the switch 100, such as a stress test on the switch 100, hardware diagnostics, and debug programs. The third party management controller 110 can provide patches, updates, and the like to the applications 126 and 128 on the secondary processing unit 104 without having to access the main processing unit 102. Thus, the third party management controller 110 can provide the updates to the applications 126 and 128 in the Linux environment of the secondary processing unit 104 without having to send the updates to the management controller 108 so that the management controller can port the updates to the VxWorks, which is run on the main processing unit 102.

The secondary processing unit 104 can be an open platform that can allow users of the switch 100 to install their own applications on the secondary processing unit, which can provide the users with greater flexibility in controlling the operation of the switch. The separation between the main processing unit 102 and the secondary processing unit 104 can also provide protection to the main processing unit from software bugs and/or viruses that may be in the third party applications 126 and 128 run on the secondary processing unit. If the secondary processing unit 104 is destroyed or damaged, the main processing unit 102 can migrate one or more of the applications 126 and 128 from the secondary processing unit 104 to the additional processing unit 106.

In an embodiment, when the one or more applications have been migrated from the secondary processing unit 104 to the additional processing unit 106, the secondary processing unit can be disabled or shut down. The additional processing unit 106 can then execute application 134 and can communicate with the main processing unit 102 via the open HAL 130 and IONS module 132. The main processing unit 102 can also assign the portions of ports 136-150 that were previously assigned to the secondary processing unit 104 to the additional processing unit 106. The management controller 108 can also control the migration of the applications and services from the additional processing unit 106 to another processing unit via the main processing unit 102, such that the applications and services can be continually migrated from one processing unit to the next without affecting the control service plane of main processing unit 102 of the switch 100.

Figure 2:
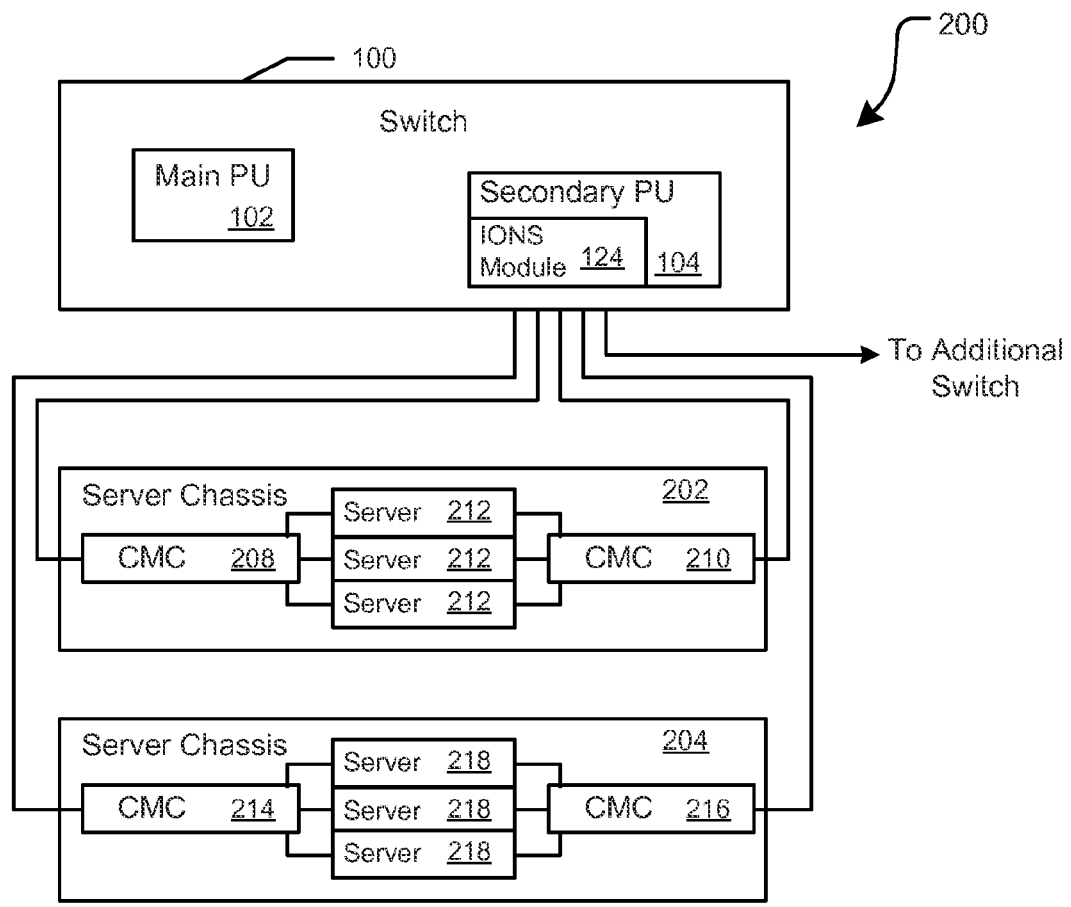
FIG. 2 is a block diagram of an information handling system including the integrated open switch device and service chassis.

FIG. 2 shows a system 200 including server chassis 202 and 204, and the switch 100. The server chassis 202 includes chassis management controllers (CMCs) 208 and 210, and servers 212. The server chassis 204 includes CMCs 214 and 216, and servers 218. In an embodiment, the servers 212 and 218 can be blade servers. The switch 100 includes the main processing unit 102, the secondary processing unit 104, the IONS module 124, and the ports 136-150 as shown in FIG. 1. The CMCs 208, 210, 214, and 216 are in communication with the IONS module 124 of the secondary processing unit 104. The ports 136-150 can be partitioned such that a specific number of ports are assigned to the secondary processing unit 104, and other ports are assigned to the main processing unit 102. Data received on the specific number of ports assigned to the secondary processing unit 104 can be routed directly to the secondary processing unit without interfacing with the main processing unit 102.

The IONS module 124 of the secondary processing unit 104 can be configured to execute the functions of a CMC, such that the secondary processing unit can provide central chassis management for the server chassis 202 and 204. The secondary processing unit 104 can receive configuration information for the server 212 and 218 from the third party management controller 110 of FIG. 1, from a user of the system 200, or the like. The configuration information can include power management for the servers 212 and 218, a request to shut down or power on one or more servers, to install updates on the servers, or the like.

The IONS module 124 can determine whether the configuration information is for all of the servers connected to the secondary processing unit 104 or to only a select number of servers. If the configuration information is for servers 212 and 218, the IONS module can send the configuration information to the CMCs 208, 210, 214, and 216, which in turn can send the configuration information to the servers. In another embodiment, the secondary processing unit can be in communication with other processing units in additional switches, which in turn can be connected to multiple CMCs of different server chassis. Thus, the user of the system 200 can provide the configuration information for multiple servers connected to multiple switches to just the secondary processing unit 104, which can then send the configuration information to the servers associated with the configuration information.

Figure 3:
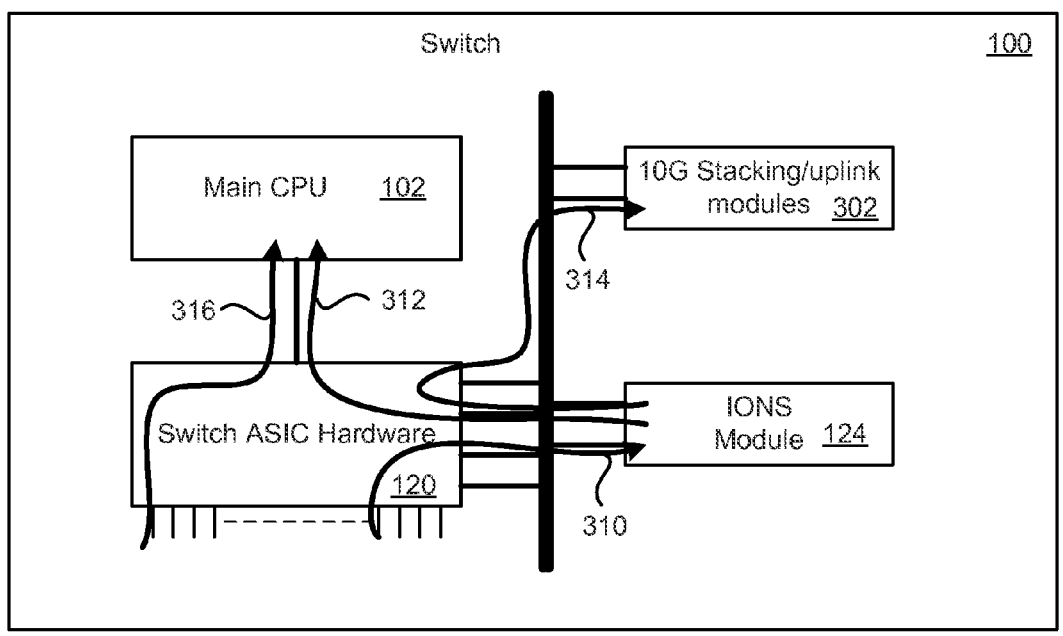
FIG. 3 is a block diagram of the integrated open switch device with exemplary packet flow in the integrated open switch device.

FIG. 3 shows the integrated open switch device 100 with exemplary packet flow in the integrated open switch device. The integrated open switch device 100 includes stacking/uplink modules 302, the main processing unit 102, the switch ASIC hardware 120, and the IONS module 124 of the secondary processing unit 104. When a packet needing services from the IONS module 124 without first needing intervention from the main processing unit 102, the packet can be routed by programming ASIC tables in the switch ASIC hardware 120 as discussed above and as represented by data flow 310. The ASIC tables can direct the packet based on additional information in the switch ASIC hardware 120, such as layer 3 tables, ternary content addressable memory (TCAM) entries, or the like.

Applications running on the IONS module 124 can communicate with the main processing unit 102 via a built-in remote procedure call (RPC) mechanism as shown by data flow 312. The RPC mechanism can provide isolation between the main switch platform. As shown by data flow 314, the applications running on the IONS module 124 can utilize the switch ASIC hardware 120 to communicate with any other port or component of the integrated open switch device 100 through Ethernet packet addressing, switch ASIC hardware table entries, and the like. The packets associated with control plane services running on the main processing unit 102 can be routed without any modification to typical data flow as shown by data flow 316.

Figure 4:
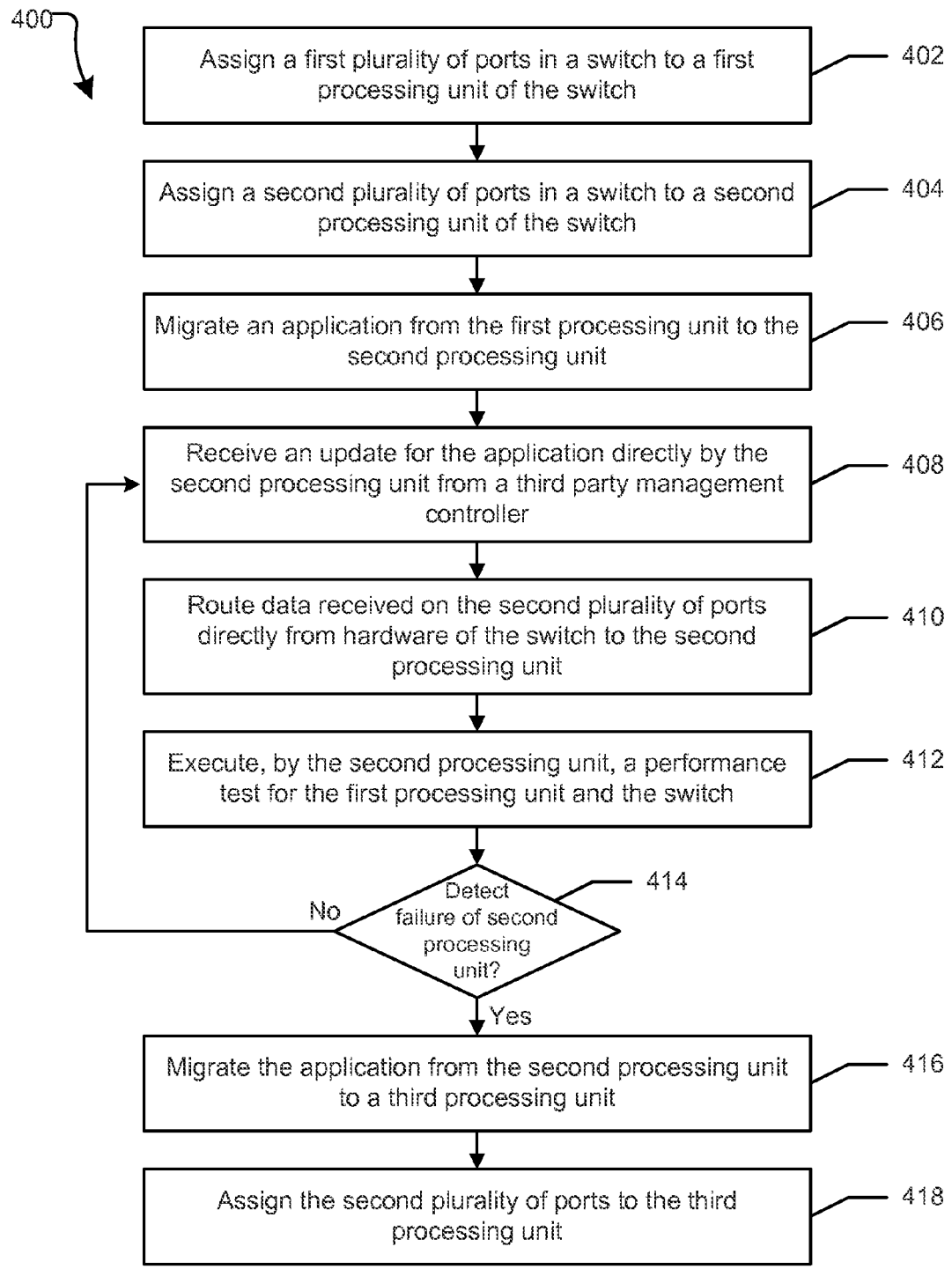
FIG. 4 is a flow diagram of a method for configuring and operating the integrated open switch device.

FIG. 4 shows a flow diagram of a method 400 for configuring and operating the integrated open switch device. At block 402, a first plurality of ports in the switch is assigning to a first processing unit of the switch. A second plurality of ports in the switch is assigned to a second processing unit of the switch at block 404. In an embodiment, the first processing unit is isolated from the second processing unit, and the first processing unit has a first operating system and the second processing unit has a second operating system. At block 406, an application is migrated from the first processing unit to the second processing unit. The migration of the application can be performed by the first processing unit in response to a command from a management controller. In an embodiment, the second processing unit can perform the application without using capacity of the first processing unit, and the application is an application that is typically executed in the first processing unit.

An update for the application received directly by the second processing unit from a third party management controller at block 408. At block 410, data received on the second plurality of ports is routed from hardware of the switch directly to the second processing unit. A performance test on the first processing unit and the switch is executed by the second processing unit at block 412. In an embodiment, the performance of the first processing remains constant during the execution of the performance test by the second processing unit. At block 414, a determination is made whether a failure of the second processing unit is detected. If the failure of the second processing unit is not detected, the flow continues as stated above at block 408. If the failure of the second processing unit is detected, the application is migrated by the first processing unit from the second processing unit to a third processing unit at block 416. At block 418, the second plurality of ports is assigned to the third processing unit in response to the failure of the second processing unit.

Figure 5:
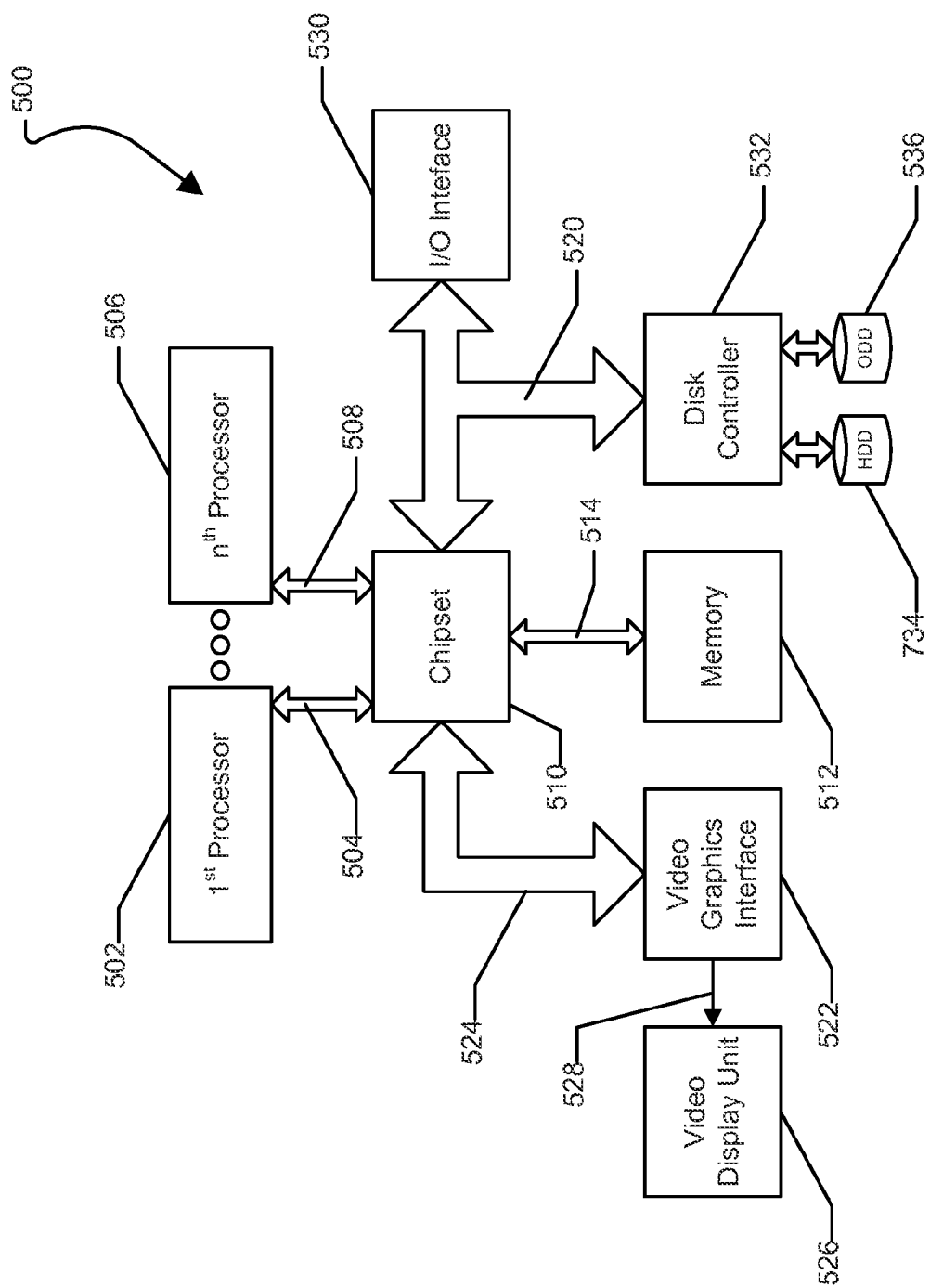
FIG. 5 is a block diagram of a general information handling system.

FIG. 5 illustrates a block diagram of a general information handling system, generally designated at 500. In one form, the information handling system 500 can be a computer system such as a server. As shown in FIG. 5, the information handling system 500 can include a first physical processor 502 coupled to a first host bus 504 and can further include additional processors generally designated as $n^{th}$ physical processor 506 coupled to a second host bus 508. The first physical processor 502 can be coupled to a chipset 510 via the first host bus 504. Further, the physical processor 506 can be coupled to the chipset 510 via the second host bus 508. The chipset 510 can support multiple processors and can allow for simultaneous processing of multiple processors and support the exchange of information within information handling system 500 during multiple processing operations.

According to one aspect, the chipset 510 can be referred to as a memory hub or a memory controller. For example, the chipset 510 can include an Accelerated Hub Architecture (AHA) that uses a dedicated bus to transfer data between first physical processor 502 and the $n^{th}$ physical processor 506. For example, the chipset 510, including an AHA enabled-chipset, can include a memory controller hub and an input/output (I/O) controller hub. As a memory controller hub, the chipset 510 can function to provide access to first physical processor 502 using first bus 504 and $n^{th}$ physical processor 506 using the second host bus 508. The chipset 510 can also provide a memory interface for accessing memory 512 using a memory bus 514. In a particular embodiment, the buses 504, 508, and 514 can be individual buses or part of the same bus. The chipset 510 can also provide bus control and can handle transfers between the buses 504, 508, and 514.

According to another aspect, the chipset 510 can be generally considered an application specific chipset that provides connectivity to various buses, and integrates other system functions. For example, the chipset 510 can be provided using an Intel Hub Architecture (IHA) chipset that can also include two parts, a Graphics and AGP Memory Controller Hub (GMCH) and an I/O Controller Hub (ICH). For example, an Intel 820E, an 815E chipset, or any combination thereof, available from the Intel Corporation of Santa Clara, Calif., can provide at least a portion of the chipset 510. The chipset 510 can also be packaged as an application specific integrated circuit (ASIC).

The information handling system 500 can also include a video graphics interface 522 that can be coupled to the chipset 510 using a third host bus 524. In one form, the video graphics interface 522 can be an Accelerated Graphics Port (AGP) interface to display content within a video display unit 526. Other graphics interfaces may also be used. The video graphics interface 522 can provide a video display output 528 to the video display unit 526. The video display unit 526 can include one or more types of video displays such as a flat panel display (FPD) or other type of display device.

The information handling system 500 can also include an I/O interface 530 that can be connected via an I/O bus 520 to the chipset 510. The I/O interface 530 and I/O bus 520 can include industry standard buses or proprietary buses and respective interfaces or controllers. For example, the I/O bus 520 can also include a Peripheral Component Interconnect (PCI) bus or a high speed PCI-Express bus. In one embodiment, a PCI bus can be operated at approximately 56 MHz and a PCI-Express bus can be operated at approximately 528 MHz. PCI buses and PCI-Express buses can be provided to comply with industry standards for connecting and communicating between various PCI-enabled hardware devices. Other buses can also be provided in association with, or independent of the I/O bus 520 including, but not limited to, industry standard buses or proprietary buses, such as Industry Standard Architecture (ISA), Small Computer Serial Interface (SCSI), Inter-Integrated Circuit (I²C), System Packet Interface (SPI), or Universal Serial buses (USBs).

In an alternate embodiment, the chipset 510 can be a chipset employing a Northbridge/Southbridge chipset configuration (not illustrated). For example, a Northbridge portion of the chipset 510 can communicate with the first physical processor 502 and can control interaction with the memory 512, the I/O bus 520 that can be operable as a PCI bus, and activities for the video graphics interface 522. The Northbridge portion can also communicate with the first physical processor 502 using first bus 504 and the second bus 508 coupled to the n$^{th}$ physical processor 506. The chipset 510 can also include a Southbridge portion (not illustrated) of the chipset 510 and can handle I/O functions of the chipset 510. The Southbridge portion can manage the basic forms of I/O such as Universal Serial Bus (USB), serial I/O, audio outputs, Integrated Drive Electronics (IDE), and IS 110 for the information handling system 500.

The information handling system 500 can further include a disk controller 532 coupled to the I/O bus 520, and connecting one or more internal disk drives such as a hard disk drive (HDD) 534 and an optical disk drive (ODD) 536 such as a Read/Write Compact Disk (R/W CD), a Read/Write Digital Video Disk (R/W DVD), a Read/Write mini-Digital Video Disk (R/W mini-DVD), or other type of optical disk drive.

Although only a few exemplary embodiments have been described in detail above, those skilled in the art will readily appreciate that many modifications are possible in the exemplary embodiments without materially departing from the novel teachings and advantages of the embodiments of the present disclosure. For example, the methods described in the present disclosure can be stored as instructions in a computer readable medium to cause a processor, such as chipset 510, to perform the method. Additionally, the methods described in the present disclosure can be stored as instructions in a non-transitory computer readable medium, such as a hard disk drive, a solid state drive, a flash memory, and the like. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A device comprising:
a first processing unit to execute a performance test on the device; and
a second processing unit in communication with the first processing unit, the second processing unit to migrate an application from the second processing unit to the first processing unit in response to a command from a management controller, to detect a failure of the first processing unit, to migrate the application to a third processing unit prior to the first processing unit being disabled in response to the failure of the first processing unit, and to assign a first plurality of ports to the third processing unit in response to the failure of the first processing unit.

2. The device of claim 1 wherein the second processing unit is further to assign the first plurality of ports to the first processing unit prior to the failure of the first processing unit, and to assign a second plurality of ports to the second processing unit prior to the failure of the first processing unit.

3. The device of claim 1 wherein the second processing unit is a main central processing unit for the device and the first processing unit is a secondary purpose processing unit for the device.

4. The device of claim 1 wherein the first processing unit is isolated from the second processing unit.

5. The device of claim 1 wherein the first processing unit has a first operating system and the second processing unit has a second operating system.

6. A system comprising:
a switch including:
a first processing unit; and
a second processing unit in communication with the first processing unit, the second processing unit to migrate an application from the second processing unit to the first processing unit, to detect a failure of the first processing unit, and to migrate the application to a third processing unit in response to the failure of the first processing unit; and
a first server chassis including:
a first plurality of servers; and
a first chassis management controller in communication with the first processing unit, and in communication with the first servers, the first chassis management controller to receive configuration information for the first servers from the first processing unit.

7. The system of claim 6 wherein the switch further comprises:
a first plurality of ports assigned to the first processing unit by the second processing unit; and
a second plurality of ports assigned to the second processing unit.

8. The system of claim 7 further comprising:
a second server chassis including:
a second plurality of servers; and
a second chassis management controller in communication with the first processing unit via one of the first ports, and in communication with the second servers, the second chassis management controller to receive configuration information for the second servers from the first processing unit.

9. The system of claim 8 wherein the configuration information for the second servers is the same as the configuration information for the first servers.

10. The system of claim 7 wherein the second processing unit is further to assign the first ports to the third processing unit in response to the failure of the first processing unit.

11. The system of claim 6 wherein the second processing unit is a main central processing unit for the switch and the first processing unit is a secondary central processing unit for the switch.

12. The system of claim 6 wherein the first processing unit includes a module that performs functions of a central chassis management controller.

13. A method comprising:
executing, by a second processing unit, a performance test on a first processing unit and a switch;
migrating an application from the second processing unit to the first processing unit in response to a command from a management controller;
detecting a failure of the first processing unit;

migrating the application to a third processing unit prior to the first processing unit being disabled in response to the failure of the first processing unit; and assigning a first plurality of ports to the third processing unit in response to the failure of the first processing unit.

14. The method of claim 13 further comprising:

assigning the first ports in the switch to the first processing unit prior to detecting the failure of the first processing unit;

assigning a second plurality of ports in the switch to the second processing unit;

receiving, from a third party management controller, an update for the application directly to the second processing unit; and routing data received on the second ports from hardware of the switch directly to the second processing unit.

15. The method of claim 13 wherein the second processing unit can perform the application without using capacity of the first processing unit.

16. The method of claim 13, wherein performance of the first processing unit remains constant during the execution of the performance test by the second processing unit.

17. The method of claim 13 wherein the first processing unit is isolated from the second processing unit.

18. The method of claim 13 wherein the application is typically executed in the second processing unit.

19. The method of claim 13 wherein the first processing unit has a first operating system and the second processing unit has a second operating system.

20. The system of claim 13 wherein the first processing unit is a main central processing unit for the switch and the second processing unit is a secondary central processing unit for the switch.

* * * * *